United States Patent [19]

Saurenman

[11] Patent Number: 4,493,289

[45] Date of Patent: * Jan. 15, 1985

[54] FLEXIBLE CABLE ION DISPENSER FOR TREATMENT ZONES

[75] Inventor: Donald G. Saurenman, Whittier, Calif.

[73] Assignee: Consan Pacific Incorporated, Whittier, Calif.

[ * ] Notice: The portion of the term of this patent subsequent to Aug. 11, 1998 has been disclaimed.

[21] Appl. No.: 241,684

[22] Filed: Mar. 9, 1981

Related U.S. Application Data

[63] Continuation-in-part of Ser. No. 124,242, Feb. 25, 1980, Pat. No. 4,282,830.

[51] Int. Cl.³ .............................................. A01K 31/00
[52] U.S. Cl. .................................................... 119/21
[58] Field of Search .................. 119/21; 361/224, 230, 361/231, 232

[56] References Cited

U.S. PATENT DOCUMENTS

| | | | |
|---|---|---|---|
| 2,585,799 | 2/1952 | Lawrence | 426/510 |
| 3,696,791 | 10/1972 | Saurenman et al. | 119/21 |
| 3,976,916 | 8/1976 | Saurenman | 361/231 |
| 4,282,830 | 8/1981 | Saurenman | 119/21 |

Primary Examiner—Hugh R. Chamblee
Attorney, Agent, or Firm—William W. Haefliger

[57] ABSTRACT

Ion dispensing apparatus comprises:
(a) a flexible cable including an elongated metallic core to which voltage is applicable, the cable including a protective sleeve of insulating material on and extending along and about the core, the sleeve defining a wall,
(b) and needles having shanks penetrating through said sleeve wall and extending sidewardly adjacent the core to make electrical contact therewith so as to receive application of said voltage, the needles having tips openly exposed outwardly of the cable to dispense ions into the atmosphere near the cable.

23 Claims, 12 Drawing Figures

FLEXIBLE CABLE ION DISPENSER FOR TREATMENT ZONES

This application is a continuation-in-part of Ser. No. 124,242 filed Feb. 25, 1980, now U.S. Pat. No. 4,282,830.

BACKGROUND OF THE INVENTION

This invention relates generally to the provision of flexible cable means with ion dispensing needles, stringable in zones for treatment of animals, edibles and other articles.

The feeding areas of animals, as for example, poultry (chicken, turkey, ducks, etc.) are typically dusty due to the stirring up of dusty litter or droppings and feed particles. As a result, fowl become nervous or irritated as indicated by increased fluttering, they tend to consume less feed, lay fewer eggs and add less weight, creating an economic loss. Animals other than fowl are also affected in a similar manner.

This condition is further aggravated by the production of ammonia gas and odors formed by the action of micro-organisms on droppings and in litter on the floor, as well as dampness. At 15 p.p.m. ammonia gas in the air can be detected by humans; at 50 p.p.m. such gas becomes detrimental to poultry health; and the gas becomes toxic at 100 p.p.m. Ammonia gas concentration around poultry enclosures is often so high that it will cause tear production in human eyes. Many poultry houses are provided with air blowers to furnish up to 7 c.f.m. of moving air in order to keep the ammonia gas and odor level down. This involves considerable expense for blowers and their operation, as well as added heating of such blown air drawn from the outside during cold weather. While poultry is specifically mentioned, it will be understood that animals other than poultry are similarly affected.

One method and means to overcome the above problem is disclosed in U.S. Pat. No. 3,696,791. While of unusual advantage, the manufacturing and installation time and cost of that ion dispensing means is higher than desirable.

In addition, there are certain objections and disadvantages associated with conventional smoke treatment of consumables such as meat. Among these are the length of curing time required for adequate exposure of the meat to the smoke which fills the enclosure wherein the meat is supported; the cost of hardwood or other fuel required to produce such smoke; and the pollution of the outside air to which the smoke is vented. While certain proposals have been made toward alleviating these problems, none to my knowledge has provided the unusual advantages associated with the present invention, as will appear. Among these are reduced smoke exposure time; reduced smoke and fuel requirements; greatly reduced pollution; and ease of locating in dispensing cables means in smoke treating zones.

Finally, there is need for low cost, efficient means to induce collection of air-borne particles, and to suppress static build-up in certain article treating zones (electric parts production, plastic parts or material production, paper rolling apparatus, surgical operating rooms, clean room assemblies, and circuit board fabrication, etc.). Prior ion dispensing devices were not flexible and easily installable to conform the special requirements as to product shape, zone size, etc.

SUMMARY OF THE INVENTION

It is a major object of the invention to provide method and apparatus for alleviating the above problems, and employing novel apparatus including needles carried by a flexible cable.

Basically, the cable apparatus of the invention comprises:

(a) a flexible cable including an elongated metallic core to which voltage is applicable, the cable including a protective sleeve of insulating material on and extending along and about the core, the sleeve defining a wall, (b) and needles having shanks penetrating through said sleeve wall and extending sidewardly adjacent the core to make electrical contact therewith so as to receive application of said voltage, the needles having tips openly exposed outwardly of the cable to dispense ions into the atmosphere near the cable.

As will appear the needles need only be pushed into a protective sheath surrounding a flexible metallic core, so that the sheath holds the needles against the core to which high voltage is applied; and needle protective devices may be easily installed on the cable sheath. Such a cable may thus be strung, with bending, to extend in and around a treatment zone, as for example to treat animals, poultry, edibles (as in a smoke house) articles such as production parts, paper, film, plastic and plastic foam, to suppress static-build-up and air-borne particles, the construction of the flexible cable lending itself to rapid, inexpensive installation in desired areas and zones to conform to any spacial requirements.

These and other objects and advantages of the invention, as well as the details of an illustrative embodiment, will be more fully understood from the following description and drawings, in which:

DRAWING DESCRIPTION

DETAILED DESCRIPTION

Figure 1:
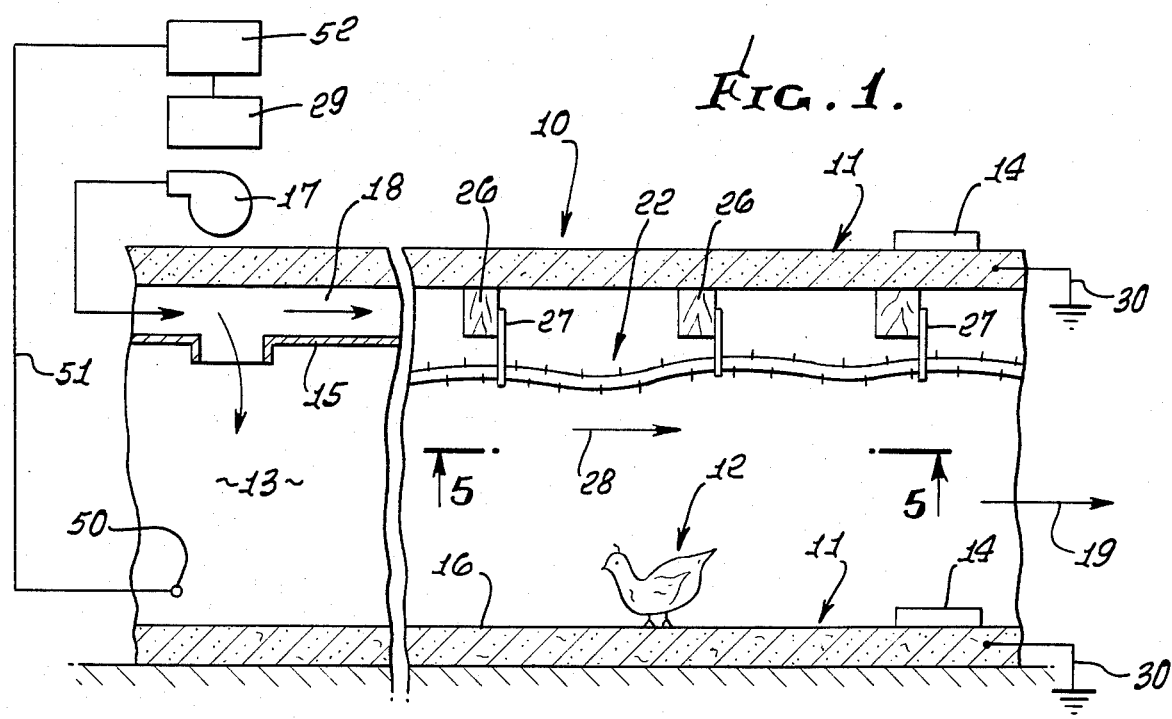
FIG. 1 is a side elevation of a poultry (or other animal) enclosure.

In the drawings, a poultry enclosure 10 contains decks 11 between which growing poultry 12 are kept in feeding zones 13, with access to feed in containers 14. This particular arrangement is illustrative only, and many different enclosure and feeding systems may be used, and for animals other than poultry.

The feeding zones characteristically contain airborne particulate matter, and there are particle collecting surfaces as at 15 and 16 exposed to the zone interiors. As stated, the presence of such air-borne particulate matter, stirred by movement of the poultry (or other animals) and by moving air, is hazardous and inhibits poultry growth and production. In this regard, ammonia gas and odor generated by droppings and urine is a further health hazard, and air blower 17 is operative to displace air currents via overhead ducting 18 into the zones 13 in an effort to remove such gas from zones 13; however, such flowing air stirs up dust particles as may originate from the environment and in the feed, further aggravating that source of irritation. Air streams leaving the enclosure via suitable outlets are indicated at 19.

Figure 2:
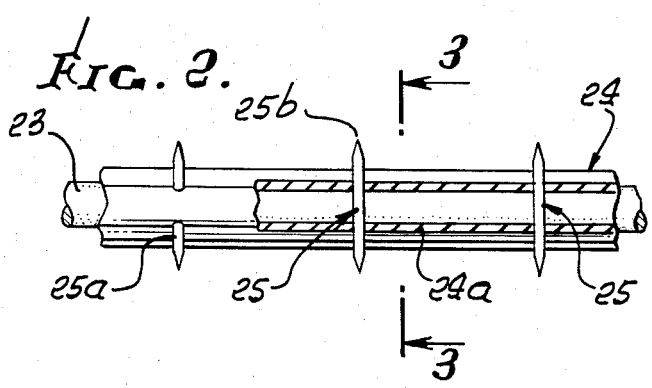
FIG. 2 is a section, in side elevation, showing an ion dispensing cable incorporating the invention.
Figure 3:
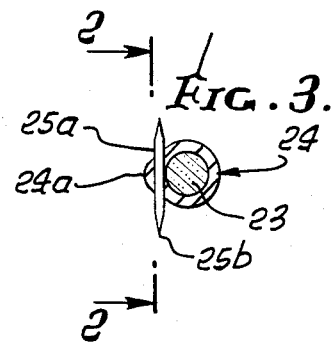
FIG. 3 is a section on lines 3—3 of FIG. 2.
Figure 4A:
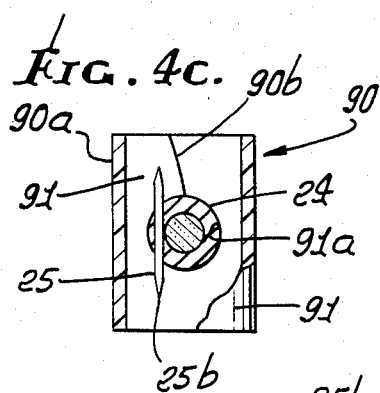
FIG. 4a is a view like FIG. 3 showing a cable with a needle protector device on the cable.
Figure 4B:
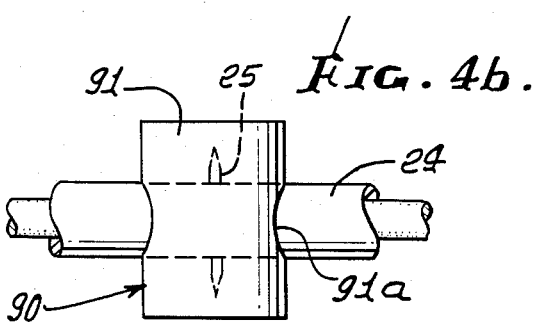
FIG. 4b is a side elevation of the FIG. 4 protector and cable.
Figure 4C:
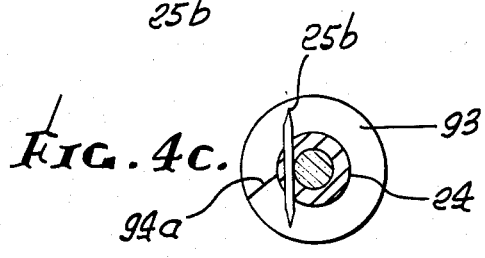
FIG. 4c is a view like FIG. 4a showing a modified needle protector on a cable.
Figure 4D:
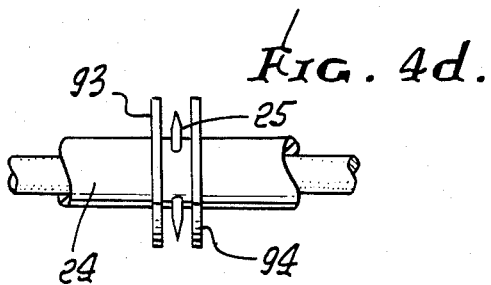
FIG. 4d is a side elevation of the FIG. 4c protector and cable.
Figure 5:
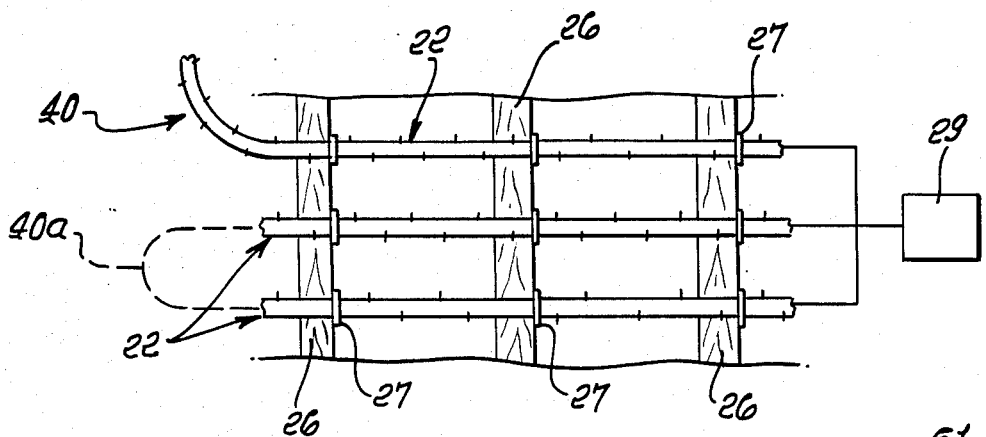
FIG. 5 is an upward looking plan view on lines 5—5 of FIG. 1.

In accordance with the invention, ions are dispensed into the zones 13 and with density and polarity to induce collection of the air-borne particles on the collecting surfaces. In addition, the dispensing step may be carried out to travel the ions into contact with air-borne micro-organisms and droppings or contaminants in the zone, thereby to inhibit ammonia generation and diffusion. Means to dispense ions may advantageously comprise one or more cables, indicated at 22, and which are typically flexible, and each including an elongated and sidewardly penetratable metallic core 23 to which voltage is applicable. As seen in FIGS. 2 and 3, the core may consist of 18-22 gage strands of copper or aluminum, or other electrically conductive material. The cable also includes a protective sleeve 24 of insulative material on and extending about and along the core. The insulative sleeve may for example consist of polypropylene or polyethylene.

The ion dispensing apparatus also includes needles 25 having shanks 25a penetrating through the sleeve wall 24a and sidewardly adjacent the core to make electrical contact therewith, the needles typically consisting of electrically conductive material such as stainless steel, plated with copper or gold alloy. The needles, to which voltage is transmitted via the cable core have sharp tips 25b openly exposed outwardly of the cable to dispense ions into the atmosphere near the cable. As shown, the needles are compressively retained by the stretched sleeve in sideward contact with the core. This construction avoids need for needle penetration into the core.

In FIGS. 1 and 5, multiple cables 22 are suspended from beams 26 associated with enclosure 10, the cables typically extending in parallel relation. Ties 27 suspend the cables from the beams, and may consist of NYLON, for example, whereby the cables may readily be located to most effective use, in the upper interior of zone 13, in the path of air streams 28 so that negative ions produced at the needle tips by corona effect are electrically repulsed and travel divergently outwardly into the air. One useful circuit to provide the voltage source 29 is described in U.S. Pat. No. 3,308,344. The decks 11 are typically grounded (i.e. made electrically positive) at 30, whereby negatively charged dust particles and micro-organisms are electrostatically attracted to deck surfaces.

Negative ions not only act to substantially reduce (by settling) the air-borne particulate matter including micro-organisms, but they also are believed to cause celia in the poultry breathing organs to operate efficiently thus causing the respiratory system to better filter out any particulate matter and micro-organisms remaining in the air. This also improves poultry (or animal) health.

As described in U.S. Pat. No. 3,696,791, an increase in poultry feeding to gain full size within six weeks rather than the normal eight weeks was achieved after use of the ion dispensing means and method described, with about 2,000 static volts maintained in the air at 13, all other conditions remaining the same before and after inclusion of the ion dispensers. Higher static volt levels, say up to 4,000 or 5,000 produce even better results in terms of rate of weight gain. Good results are obtainable with negative supply voltage between 500 and 18,000 or above. Another beneficial result is a reduction in the amount of the blown air needed to remove ammonia gas. It was also found that good results were obtained when voltage delivery to the needles, i.e., ion production, was intermittent, i.e., several time periods "on", several periods etc. "off", etc. It has been found that negative ions produce the best results but both negative and positive ions may be dispensed, with negative ions predominating.

It is clear from FIG. 3 that the needles may be out of alignment lengthwise of the cable, although some may be in alignment. Typically, the needles 25 are located at intervals of between about 2 inches to several feet along the cable length; and the core is between about 3/16–½ inch in diameter. Thus, the flexible cable is adapted to be bent or curved (as at 40 in FIG. 5) lengthwise to be strung about the zone 13 as desired. Accordingly, the cable is bent or curved as at 40 and 40*a* to conform with a desired relation within the zone forming means (such as a housing) to produce sufficient ions to suppress dust particles and ammonia.

FIG. 1 also shows a static voltage sensor 50 in zone 13, and connected in feed-back relation at 51 to a control device 52 for the voltage generator 29, and operating to control the voltage level or "on-off" or other output parameter of 29 so as to maintain desired static voltage level at 13.

Additional advantages of the invention include:

(1) reduced cost of materials;

(2) increased ion output due to needles not being enclosed;

(3) reduced cost of installation and maintenance, due to ease of cleaning of needles, as by a brush;

(4) random location of needles along and about a cable axis;

(5) ease of installation of the needles on the cable as by pushing them through the sleeve so as to be held adjacent the core of the sleeve.

FIGS. 4*a* and 4*b* illustrate one form of protective means on the cable and projecting outwardly thereof proximate the needles in protective relation with the tips. As shown, the protective means comprises tubular elements 90 extending about the needles and having resiliently spreadable slits accommodating their application to the cable. See for example the plastic tubular bodies 90*a* sized to fit about the cable when slits or slits 90*b* are spread apart, the slits located in opposite walls 91. The latter define openings 91*a* to pass the cable. Accordingly, the user is protected against shocks from touching the needle tips, and the needle tips are protected against blunting by contact against solid objects. FIGS. 4*c* and 4*d* shows modified protective means in the form of plastic flanges 93 and 94 on the cable at axially opposite sides of each needle, and extending in plane generally normal to the cable length or axis. The flanges project radially outwardly beyond the needle tips as to the protectors 91. Each flexible annular flange may be slit as at 94a to accommodate its application to the cable. The flange inner diameter is approximately the same as the cable outer diameter.

Figure 6:
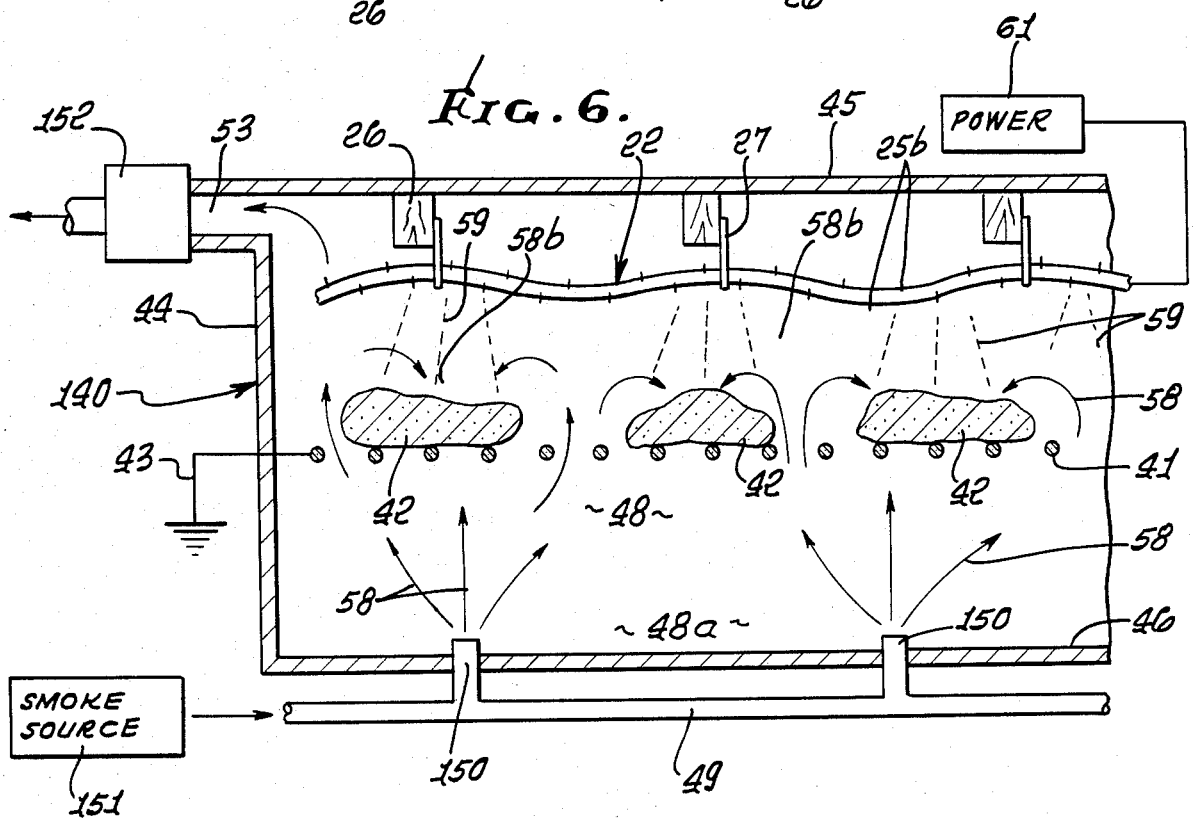
FIG. 6 is a side elevation of a smoke house interior.

In FIG. 6, a smoke house or enclosure 140 contains a support such as a metallic rack or grate 41 on which bodies of meat (or other consumables) 42 are supported. The rack may be suitably electrically grounded, as indicated at 43; alternatively, the smoke house walls 44 may be grounded, and the metallic rack or grate connected to such walls. The house also typically includes a roof 45 and a floor 46, and means such as fans or other apparatus may be located in the interior zone 48 to cause smoke to thoroughly circulate about the meat bodies for intimate contact therewith.

Smoke may be delivered to the interior 48 as via a duct 49 with outlets 150 spaced along the floor, i.e. beneath the rack 41, so that smoke rises under and toward the meat. A suitable smoke source is indicated at 151, connected with duct 49. Outlet 53 from zone 48 serves to deliver excess smoke to the exterior via damper valve 152. In the past, such excess smoke escape was considered objectionable, as constituting a source of pollution, as well as a cost item.

Electrically charged ions are dispersed or dispensed into the smoke particles, with the ion charge causing the smoke particles to be attracted onto the consumables or edibles, such as the meat. In this regard, the ions typically carry negative charge, which is imparted to the smoke particles causing them to be attracted to the meat, the latter initially having an electrical charge or charges which is or are more positive than that of the dispersed ions. Thus, for example, the meat may be effectively grounded because of its contact with grounded grate or rack 41.

In FIG. 6 the smoke is dispersed into a lower region 48a of zone 48 below the edibles, to rise in currents 58 against the undersides of the meat bodies, and between the meat bodies, into the upper region 58b of zone 18 wherein the ions are dispersed. As a result, the smoke particles in zone 58b then are attracted back downwardly toward and onto the meat, whereby the meat becomes effectively smoke treated much more rapidly than in the past where ion treatment was not employed.

The means to disperse charged ions (see broken lines 59) into the smoke is shown to include cables 22 as previously described, in FIGS. 1-5, and which are strung or hung to extend generally horizontally and in upper zone 18b above the meat or edibles. Such cables include ion dispensing needle tips 25b as described. A power source at 61 for delivering high voltage to the cable core and the needles and tips may be as disclosed in U.S. Pat. No. 3,308,344. Between 2,000 and 50,000 volts DC are typically applied to the tips. Cable supports appear at 26 and 27.

Inasmuch as the smoke particles are attracted to the meat or edibles, very little if any excess smoke requires venting at outlet 53, smoke pollution is effectively eliminated, and minimum smoke is required, saving expense. Also, the smoke treatment time for the edibles is minimized.

Figure 7:
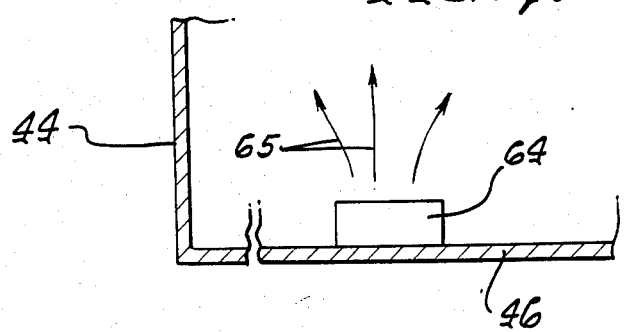
FIG. 7 is a side elevation of a modified lower portion of the FIG. 1 smoke house interior.

In FIG. 7, the smoke source is shown to comprise wood chips above burners, each burner and chip unit being indicated at 64. Rising smoke is indicated at 65.

Figure 8:
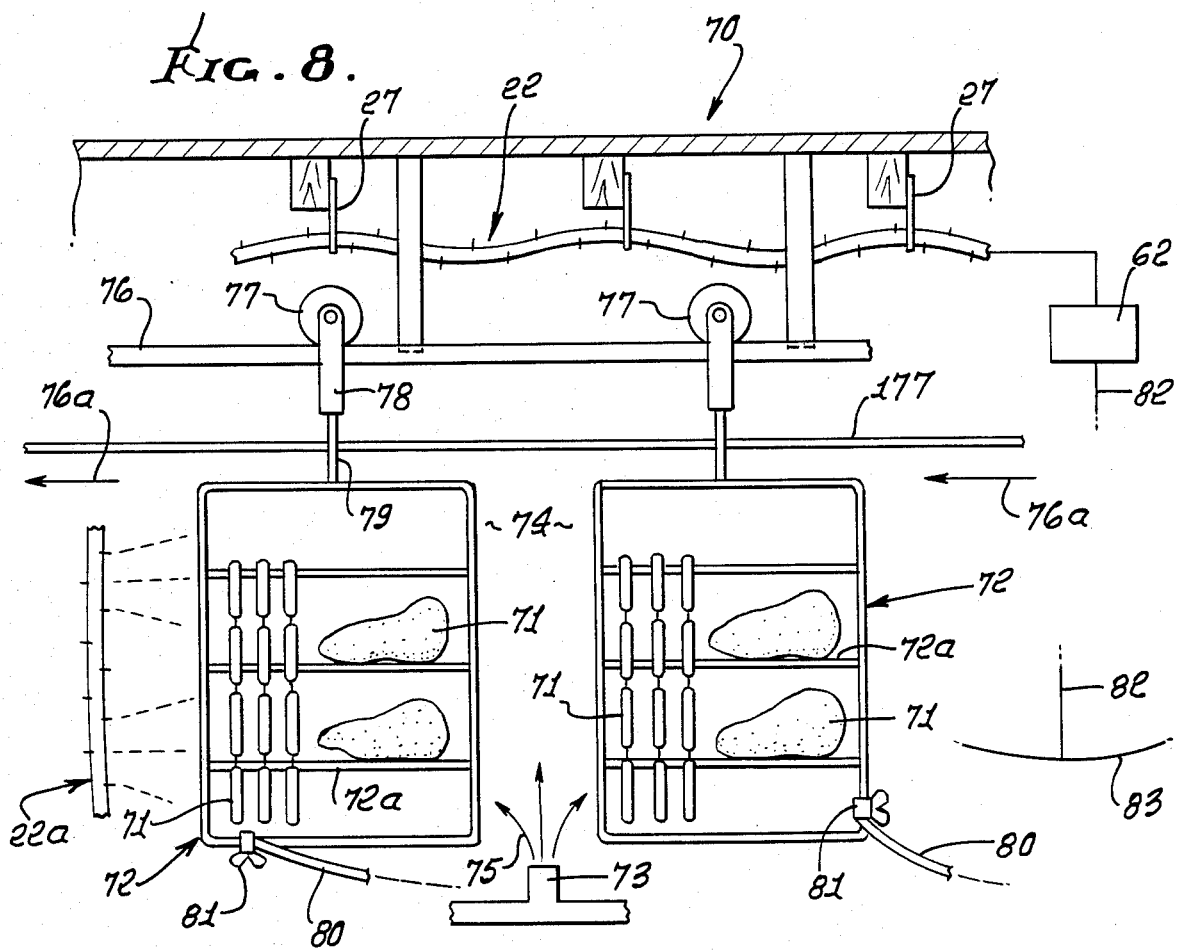
FIG. 8 is a side elevation of a further modification of a smoke house interior.

Referring to FIG. 8 smoke house or enclosure 70 contains means supporting multiple edibles 71, such as meat for example. The support means is shown as a metallic carriage 72 with metal supports 72a for the edibles. Smoke source 73 delivers liquid smoke or smoke from a wood chip or sawdust or other fire, to the carriage traverse zone 74, arrows 75 indicating such delivery. Smoke may be produced outside the smoke house and then blown into the smoke house. The support means is shown as movably supported on a rail 76, and for that purpose wheels or rollers 77 move along the rail, wheel support brackets 78 extending under the rail. Upward extensions 79 of the carriages extend through insulative tubular fittings which extend vertically through the bracket extensions 78, and support the carriage extensions, as shown. Therefore, the carriages are electrically insulated from the rail 76. As another alternative, the rail 76 may be electrically insulated from its support structure. These are examples, only. Means to advance the supports 72 to the left, as indicated by arrows 76a, may include a pull line 177 attached to the supports, or other means.

Means is provided to disperse charged ions into the smoke and into zone 74, with the ions carrying an electrical charge of a polarity causing smoke particles to be attracted to the edibles. Such means is indicated at 22, and take the form of the flexible cable with needle tips previously described. The cable 22 is easily strung to extend back and forth in the enclosure interior, with suitable bends, as previously described, all for the purpose of providing sufficient ions to treat the edibles. Cable supports appear at 27. A cable power source is seen at 62. Vertical cable appears at 22a.

Means is also provided for maintaining the edibles at an electrical potential or potentials aiding attraction of the smoke particles to the edibles, for enhancing efficiency of smoke deposition, whereby less smoke delivery is needed (less smoke is wasted), the exposure time duration of the edibles to the smoke streams is reduced; and less pollution of air escaping to the interior results. Such means takes the form of structure electrically grounding the edibles, as via the supports 72 for example. Thus, an electrically conductive metallic cable 80 is advantageously employed, and is clipped into firm contact with the metallic supports 72 via alligator clips 81. The cable itself travels along with the supports by virtue of its suspension therefrom, and it may be grounded as by connection to a slack return line 83 connected at 82 to the return or "ground" terminal of the power circuitry 62. The latter terminal is typically positive if the ions dispensed are of negative polarity. Line 83 is slack so as to be free to travel with cable 80 as the latter travels along its looping path. Other type ground connections to cable 80 may be employed.

Examples of meat bodies and other edibles to be smoked are sausage, pork, ham, frankfurters, bacon, beef, chicken, turkey, fish, etc., others also being treatable.

The invention reduces the amount of wood smoke required on the product, and thereby reduces the bitter taste caused by tar and reduces possible cancer forming agents deposited on the product by smoke. Also, smoke pollution near smoke houses is reduced, and the need for pollution control equipment is thereby reduced.

Figure 9:
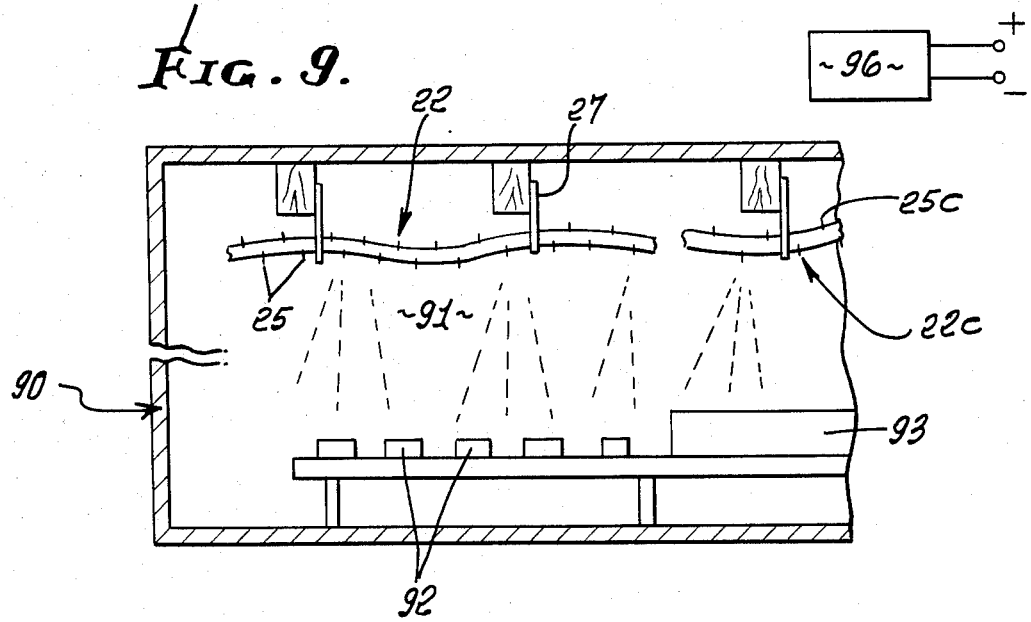
FIG. 9 is a side elevation showing an article treatment enclosure and zone, with ion dispersing flexible cable means therein.

FIG. 9 shows an enclosure 90 containing a treatment zone 91 wherein articles such as electronic parts, or plastic parts 92 are located. Apparatus 93 may process such parts and such processing may cause static charge build-up which can result in arcing and consequent hazardous fires or flames due to combustibility of plastic, etc. Flexible cable means 22 as previously described, with projecting needles 25 and associated tips, is strung in the zone 91, as for example above the parts 92. High voltage applied from a source 96 to the cable core causes ion production which neutralizes the static build-up, and also causes collection of air-borne dust particles on enclosure surfaces, so that arcing is suppressed. A second flexible cable 22c having needles 25c may be strung in parallel with but spaced from cable 22, as indicated, above the work 92. Positive high voltage may be applied to the needles of one cable and negative high voltage to the needles of the other cable (see the + and − terminals of source 96). It is found that the combined effect of the ions very efficiently and assuredly suppresses arcing otherwise due to either positive or negative charge static build-up on the articles 92. The needles are typically about 3 to 4 inches apart along the cable.

Paper, filose and other objects may be similarly threaded and parts 92 represent these objects.

I claim:

1. Ion dispensing apparatus comprising
   (a) a flexible cable including an elongated metallic core to which voltage is applicable, the cable including a protective sleeve of insulating material on and extending along and about the core, the sleeve defining a wall,
   (b) and needles having shanks penetrating through said sleeve wall and extending sidewardly adjacent the core to make electrical contact therewith so as to receive application of said voltage, the needles having tips openly exposed outwardly of the cable to dispense ions into the atmosphere near the cable.

2. The apparatus of claim 1 wherein said needles are retained by the sleeve in sideward contact with the core.

3. The apparatus of claim 2 wherein two tips are respectively located at opposite ends of each needle.

4. The apparatus of claim 1 wherein the needles are out of alignment, lengthwise of the needle.

5. The apparatus of claim 1 wherein the needles are aligned, lengthwise of the cable.

6. The apparatus of claim 1 including protective means on the cable and projecting outwardly thereof proximate the needles in protective relation with said tips.

7. The apparatus of claim 6 wherein said protective means comprises tubular elements extending about the needles and having spreadable slits accommodating their application to the cable.

8. The apparatus of claim 7 wherein each of said elements comprises a mounting portion defining a slit and closely surrounding the cable, and a protective tubular portion projecting outwardly and about a needle tip.

9. The apparatus of claim 6 wherein said protective means comprises flange means spaced apart lengthwise of the cable and extending at opposite sides of the needles.

10. The apparatus of claim 1 including
    (d) means forming a treatment zone,
    (e) and means suspending said cable in said zone.

11. The combination of claim 10 wherein said zone forming means includes supports exposed to the upper interior of said zone, said cable suspended from said supports.

12. The combination of claim 10 including multiple cable lengths suspended in the upper interior of said zone, there being at least one cable bend accommodating the cable to said zone.

13. The combination of claim 10 including edibles in said zone to be treated in response to said ion dispensing.

14. The combination of claim 13 including smoke particles in the atmosphere in said zone to be attracted to the edibles in response to said ion dispensing.

15. The combination of claim 10 including dust particles in the atmosphere in said zone to be suppressed in response to said ion dispensing.

16. The combination of claim 10 including air-borne particles and ammonia gas in said zone to be suppressed in response to said ion dispensing.

17. The method of claim 10 wherein there are supports in the upper interior of said zone, and said suspending step includes hanging the cable defined by said apparatus from said supports with the cable hanging in multiple bends.

18. The method of improving animal health and utilizing multiple pointed tips to which high voltage is supplied, which includes
    (a) openly suspending cable apparatus as defined in claim 1 in the upper interior of an animal zone, said apparatus defining said tips, and said suspending including producing a cable bend,
    (b) confining the animals in said zone, and
    (c) dispersing sufficient ions from said tips into the air around the animals and animal wastes to raise the static volt level in said zone, inhibit ammonia diffusion into said zone from animal waste, and induce collection of air-borne particles on surfaces exposed to the zone interior.

19. The method of enhancing the smoke treatment of an edible in a smoke zone, that includes
    (a) openly suspending cable apparatus as defined in claim 1 in said zone, said suspending producing a cable bend,
    (b) and applying high voltage to the cable to cause dispersing of sufficient ions from such tips as to induce enhanced collection of smoke particles on the edible.

20. In combination
    (a) means forming a treatment zone,
    (b) a first flexible cable as defined in claim 1 in said zone,
    (c) a second flexible cable as defined in claim 1 in said zone,
    (d) and means applying high positive voltage to the core of the first cable and negative voltage to the core of the second cable, the voltage sufficient to cause dispersing of positive and negative ions from the needle tips of the cables.

21. The method of suppressing air-borne particles in a treatment zone, and using a flexible cable means having a metallic core and ion dispensing tips projecting therefrom, which includes
    (a) openly suspending said cable means in said zone, said suspending including producing cable means bending, and
    (b) applying high voltage to said core means to cause dispersing of sufficient ions from said tips into said zone as to induce collection of the particles on surfaces exposed to the zone interior.

22. The method of claim 21 wherein said suspending includes stringing said cable means back and forth in the upper interior of said zone.

23. The method of claim 21 wherein said flexible cable means includes a first cable to the core of which high positive voltage is applied, and a second cable to the core of which high negative voltage is applied.

* * * * *